United States Patent
Kim

(10) Patent No.: US 11,699,230 B2
(45) Date of Patent: Jul. 11, 2023

(54) METHOD FOR FORAMINAL STENOSIS RATIO USING 3-DIMENSIONAL CT

(71) Applicant: WONKWANG HEALTH SCIENCE COLLEGE UNIVERSITY-INDUSTRY COOPERATION FOUNDATION, Iksan-si (KR)

(72) Inventor: Yon Min Kim, Seoul (KR)

(73) Assignee: WONKWANG HEALTH SCIENCE COLLEGE UNIVERSITY-INDUSTRY COOPERATION FOUNDATION, Iksan-si (KR)

( * ) Notice: Subject to any disclaimer, the term of this patent is extended or adjusted under 35 U.S.C. 154(b) by 280 days.

(21) Appl. No.: 17/162,275

(22) Filed: Jan. 29, 2021

(65) Prior Publication Data
US 2021/0233237 A1  Jul. 29, 2021

(30) Foreign Application Priority Data
Jan. 29, 2020 (KR) .................. 10-2020-0010561

(51) Int. Cl.
*G06V 10/44* (2022.01)
*G06T 7/00* (2017.01)
(Continued)

(52) U.S. Cl.
CPC ............ *G06T 7/0012* (2013.01); *G06F 18/21* (2023.01); *G06F 18/24* (2023.01); *G06V 10/44* (2022.01);
(Continued)

(58) Field of Classification Search
CPC ......... G06T 7/0012; G06T 2207/10081; G06T 2207/30012; G06T 2207/30008;
(Continued)

(56) References Cited

U.S. PATENT DOCUMENTS

| | | | |
|---|---|---|---|
| 9,594,975 B2 * | 3/2017 | Nakashima | A61B 6/5217 |
| 2013/0329979 A1 * | 12/2013 | Winternheimer | G06T 7/13 |
| | | | 382/131 |
| 2020/0373013 A1 * | 11/2020 | Cao | G16H 30/20 |

FOREIGN PATENT DOCUMENTS

JP  WO2014065317 A1  9/2016

OTHER PUBLICATIONS

J. Abbas; K. Hamoud; H. May; O. Hay; B. Medlej; Y. Masharawi; N. Peled; and I. Hershkovitz: "Degenerative Lumbar Spinal Stenosis and Lumbar Spine Configuration"; Jul. 21, 2010; EurSpine J (2010) 19:1865-1873. (Year: 2010).*

* cited by examiner

*Primary Examiner* — Siamak Harandi
(74) *Attorney, Agent, or Firm* — Bridgeway IP Law Group, PLLC; Jihun Kim

(57) ABSTRACT

A method for providing a foraminal stenosis ratio using 3-dimensional CT includes (a) transmitting a spine image of a patient to an information extracting unit by an image capturing unit in response to an input signal transmitted from an input unit; (b) extracting spine boundary information and neural foramen area information based on a pixel value of the spine image by the information extracting unit; (c) storing the spine boundary information and the neural foramen area information by an information storing unit; (d) calculating the foraminal stenosis ratio by using the spine image, the spine boundary information, and the neural foramen area information by an information calculating unit; and (e) outputting maximum neural foramen area information of the neural foramen area information, a neural foramen angle for the maximum neural foramen area information, and the foraminal stenosis ratio by an output unit.

6 Claims, 4 Drawing Sheets

(51) Int. Cl.
*G06F 18/21* (2023.01)
*G06F 18/24* (2023.01)

(52) U.S. Cl.
CPC ............... *G06T 2207/10081* (2013.01); *G06T 2207/30012* (2013.01)

(58) Field of Classification Search
CPC .... G06K 9/6217; G06K 9/6267; G06V 10/44; G06V 2201/03; A61B 6/506; A61B 5/4076; A61B 6/032; A61B 6/5205; A61B 6/54; A61B 6/563; G06F 18/21; G06F 18/24
See application file for complete search history.

METHOD FOR FORAMINAL STENOSIS RATIO USING 3-DIMENSIONAL CT

BACKGROUND OF THE INVENTION

Field of the Invention

The present invention relates to a method for providing a foraminal stenosis ratio using 3-dimensional CT, and more specifically, a method for providing a foraminal stenosis ratio using 3-dimensional CT by which the foraminal stenosis ratio is calculated from a spine image of a patient, spine boundary information, and neural foramen area information extracted based on a pixel value with respect to an area of a neural foramen which is a space between adjacent vertebrae.

Description of the Related Art

Spinal canal stenosis and foraminal stenosis are very common spinal diseases which affect a relatively large number of people of all ages. Spinal stenosis is a spinal disease induced from gradual narrowing of a spinal canal and/or a neuroforaminal space, and thus a space or a margin for neural elements is limited or restricted.

The canal stenosis can occur due to hypertrophy of any posterior and/or anterior elements in a spinal canal. The canal stenosis can also be caused by overgrowth of bone tissue, a yellow ligament, soft tissue, or a tumor in the spinal canal. As a human lifespan increases, most of senile diseases are increased, and the occurrence of spinal canal stenosis is also increased. The young population can develop the spinal canal stenosis from a congenital abnormality such as a secondary canal stenosis related to short pedicles, external injury, or other factors. As a symptom and a disease of the canal stenosis are developed, nerve elements are pressed to develop pain, weakness, numbness, burning, and tingling in general and/or, a severe case can develop bladder and bowel anxiety, bladder and bowel abnormalities, and/or paralysis of the upper and/or lower body depending on a level of affected vertebrae. In addition, the foraminal stenosis is a disease that makes a neural foramen narrow and pathologically compresses a spinal nerve exiting the spine. In addition, the foraminal stenosis can be associated with central canal stenosis or can be an independent disease.

An intervertebral foramen functions as a protective exit tunnel through which a spinal nerve can exit from a spinal canal. The intervertebral foramen is formed by a superior articular process of a lower vertebra and an inferior articular process of an upper vertebra in the posterior, by a vertebral body and an intervertebral disc in the anterior, and by a vertebral pedicle at each of the top and bottom. The foraminal stenosis means that the intervertebral foramen is narrowing. The foraminal stenosis is developed due to degenerative articular process hypertrophy in the posterior, posterolateral intervertebral disc dilatation and posterolateral vertebral body lipping (osteophyte) in the anterior, and the spine moving downward with dehydration and collapse of the intervertebral disc during a degenerative disease in the top. A stenosis ratio of the intervertebral foramen currently varies slightly between documents, but is caused by pedicles.

In the medical field, the foraminal stenosis is classified into Grade 0 (no stenosis), Grade 1 (stenosis by less than 50%), and Grade 2 (stenosis by 50% or more); however, a more quantitative and objective diagnostic method does not yet exist.

CITATION LIST

Patent Literature

Patent Literature 1: Korean Patent Registration No. 10-1543522 (Jan. 9, 2006)

Patent Literature 2: Korean Patent Registration No. 10-1090375 (Nov. 30, 2011)

SUMMARY OF THE INVENTION

In order to solve such problems described above, an object of the invention is to provide a method for providing a foraminal stenosis ratio using 3-dimensional CT by which the foraminal stenosis ratio is calculated from a spine image of a patient, spine boundary information, and neural foramen area information extracted based on a pixel value with respect to an area of a neural foramen which is a space between adjacent vertebrae.

Technical objects to be achieved by the invention are not limited to the technical object mentioned above, and the following description enables other unmentioned technical objects to be clearly understood by a person of ordinary skill in the art to which the invention belongs.

According to a configuration of the invention to achieve the object described above, there is provided a method for providing a foraminal stenosis ratio using 3-dimensional CT, the method including: (a) step of transmitting a spine image of a patient to an information extracting unit by an image capturing unit in response to an input signal transmitted from an input unit, the spine image being captured by the image capturing unit; (b) step of extracting spine boundary information and neural foramen area information based on a pixel value of the spine image by the information extracting unit; (c) step of storing the spine boundary information and the neural foramen area information by an information storing unit; (d) step of calculating the foraminal stenosis ratio by using the spine image, the spine boundary information, and the neural foramen area information by an information calculating unit; and (e) step of outputting maximum neural foramen area information of the neural foramen area information, a neural foramen angle for the maximum neural foramen area information, and the foraminal stenosis ratio by an output unit.

In an embodiment of the invention, the information extracting unit may extract the neural foramen area information by detecting a neural foramen between adjacent vertebrae by using the pixel value of the spine image obtained by erasing a facet joint and a spinous process from the spine image of the spine of the patient with a program.

In the embodiment of the invention, the (b) step may include: (b1) step of extracting the neural foramen area information by rotating the spine image by 1° in a Y-axis direction and then rotating the spine image around a spine of the spine image by 1° at a time to reach 360° by the information extracting unit; and (b2) step of transmitting an angle of the neural foramen, the neural foramen area information depending on the angle of the neural foramen, and the maximum neural foramen area information to the information storing unit by the information capturing unit. The spine image may be rotated by up to 30° in the Y-axis direction.

In the embodiment of the invention, the (d) step may include: (d1) step of transmitting an image of the maximum neural foramen area information and the angle of the neural foramen to the output unit by the information calculating unit, the maximum neural foramen area information and the angle of the neural foramen being transmitted from the information storing unit; and (d2) step of transmitting a spine image obtained when rotation is performed by 180° of the obtained spine images to the output unit by the information calculating unit.

In the embodiment of the invention, the (d) step may include: (d3) step of mathematically estimating the foraminal stenosis ratio by comparing the neural foramen area information with reference to the spine image having the maximum neural foramen area information of items of the neural foramen area information by the information calculating unit; and (d4) step of estimating the foraminal stenosis ratio by comparing a roundness value of the spine boundary information with preset neural foramen area information by the information calculating unit.

In the embodiment of the invention, the information storing unit may store a normal model obtained through deep learning of image information of an unspecified number of neural foramina. When the foraminal stenosis ratio is difficult to calculate due to the roundness value of less than 0.5, the (d) step may include: (d5) step of calculating the foraminal stenosis ratio by comparing the neural foramen with at least one of other neural foramina; and (d6) step of calculating the foraminal stenosis ratio by comparing the normal model with the neural foramen by the information calculating unit.

In the embodiment of the invention, in the (e) step, the output unit may output the foraminal stenosis ratio and at least one of an image of the maximum neural foramen area information and the angle of the neural foramen and a spine image obtained when the rotation is performed by 180° of the spine images.

DETAILED DESCRIPTION OF THE PREFERRED EMBODIMENT

Hereinafter, the invention is to be described with reference to the accompanying drawings. However, the invention can be realized as various different examples and thus is not limited to an embodiment described here. Besides, a part irrelevant to the description is omitted from the drawings in order to clearly describe the invention, and similar reference signs are assigned to similar parts through the entire specification.

In the entire specification, a case where a certain part is "connected to (attached to, in contact with, or coupled to)" another part means not only a case where the parts are "directly connected" to each other, but also a case where the parts are "indirectly connected" to each other with another member interposed therebetween. In addition, a case where a certain part "comprises" a certain configurational element does not mean that another configurational element is excluded but means that the other configurational element can be further included, unless specifically described otherwise.

Terms used in this specification are only used to describe a specific embodiment and are not intended to limit the invention thereto. A singular form of a noun includes a plural meaning of the noun, unless obviously implied otherwise in context. In this specification, words such as "to comprise" or "to include" are understood to specify that a feature, a number, a step, an operation, a configurational element, a member, or a combination thereof described in the specification is present and not to exclude presence or a possibility of addition of one or more other features, numbers, steps, operations, configurational elements, members, or combinations thereof in advance.

Hereinafter, the embodiment of the invention will be described in detail with reference to the accompanying drawings.

1. Configurational Elements of Foraminal Stenosis Ratio Measuring Apparatus 100

Figure 1:
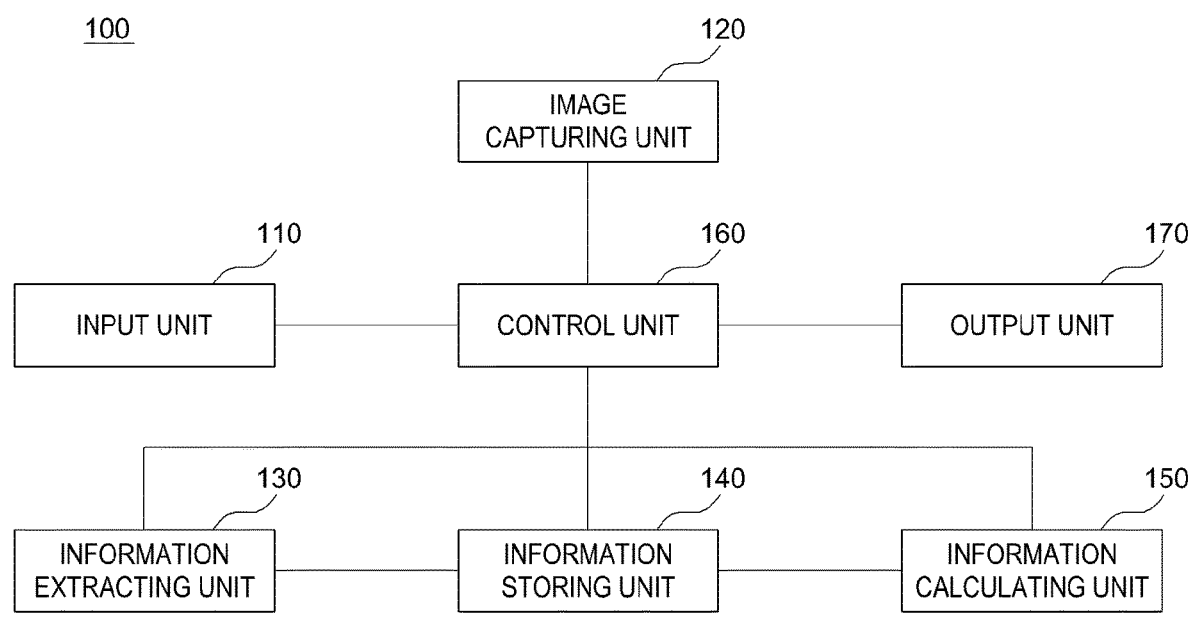
FIG. 1 is a block diagram illustrating a foraminal stenosis ratio measuring apparatus for describing a method for providing a foraminal stenosis ratio using 3-dimensional CT according to an embodiment of the invention.

FIG. 1 is a block diagram illustrating a foraminal stenosis ratio measuring apparatus for describing a method for providing a foraminal stenosis ratio using 3-dimensional CT according to an embodiment of the invention.

The foraminal stenosis ratio measuring apparatus 100 for describing the method for providing a foraminal stenosis ratio using 3-dimensional CT of the invention includes an input unit 110, an image capturing unit 120, an information extracting unit 130, an information storing unit 140, an information calculating unit 150, a control unit 160, and an output unit 170.

The input unit 110 receives an input signal indicating that a doctor is to capture a spine image of a patient, and transmission is performed to the image capturing unit 120, the information extracting unit 130, the information storing unit 140, the information calculating unit 150, and the output unit 170 in response to the inputted input signal.

The image capturing unit 120 captures the spine of the patient in response to the input signal transmitted from the input unit 110, and a captured spine image is transmitted to the information extracting unit 130. The image capturing unit 120 can be 3-dimensional CT or a scanner, for example.

The information extracting unit 130 extracts spine boundary information and neural foramen area information based on a pixel value of the spine image of the patient captured by the image capturing unit 120 and transmits the items of information to the information storing unit 140.

The information storing unit 140 stores the spine boundary information and the neural foramen area information and transmits the spine boundary information and the neural foramen area information to the information calculating unit 150 when the information calculating unit 150 requests transmission thereof.

In addition, the information storing unit 140 can store a normal model obtained through deep learning of image information of an unspecified number of neural foramina. The normal model is obtained through analysis and the deep learning of image information of an unspecified number of neural foramina based on big data, and, for example, can be an average value (=standard value within a normal range) for the image information of an unspecified number of neural foramina.

The information calculating unit 150 calculates a foraminal stenosis ratio by using a spine image, spine boundary information, neural foramen area information of a patient and transmits the foraminal stenosis ratio to the output unit 170.

The control unit 160 controls operations of the image capturing unit 120, the information extracting unit 130, the information storing unit 140, the information calculating unit 150, and the output unit 170 based on the input signal transmitted from the input unit 110.

The output unit 170 outputs the foraminal stenosis ratio and at least one of an image of maximum neural foramen area information and an angle of a neural foramen and a spine image obtained when the rotation is performed by 180° of the spine images.

2. Method for Providing Foraminal Stenosis Ratio Using 3-Dimensional CT

Figure 2:
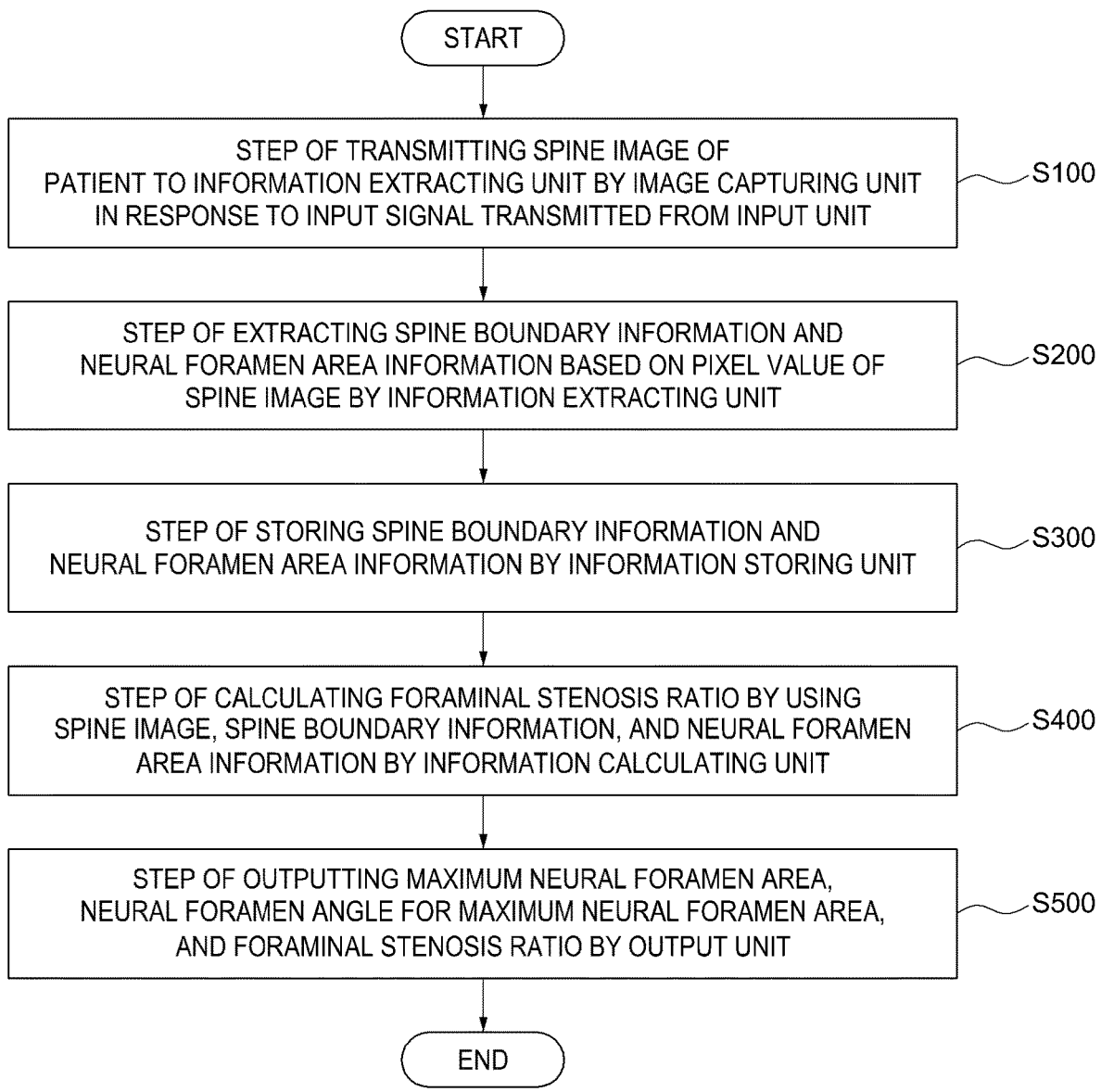
FIG. 2 is a flowchart illustrating the method for providing a foraminal stenosis ratio using 3-dimensional CT according to the embodiment of the invention.

FIG. 2 is a flowchart illustrating the method for providing a foraminal stenosis ratio using 3-dimensional CT according to the embodiment of the invention.

A method for providing a foraminal stenosis ratio using 3-dimensional CT includes: (a) Step S100 of transmitting a spine image of a patient to the information extracting unit 130 by the image capturing unit 120 in response to the input signal transmitted from the input unit 110, the spine image being captured by the image capturing unit; (b) Step S200 of extracting spine boundary information and neural foramen area information based on a pixel value of the spine image by the information extracting unit 130; (c) Step S300 of storing the spine boundary information and the neural foramen area information by the information storing unit 140; (d) Step S400 of calculating the foraminal stenosis ratio by using the spine image, the spine boundary information, and the neural foramen area information by the information calculating unit 150; and (e) Step S500 of outputting maximum neural foramen area information of the neural foramen area information, a neural foramen angle for the maximum neural foramen area information, and the foraminal stenosis ratio by the output unit 170.

Figure 3:
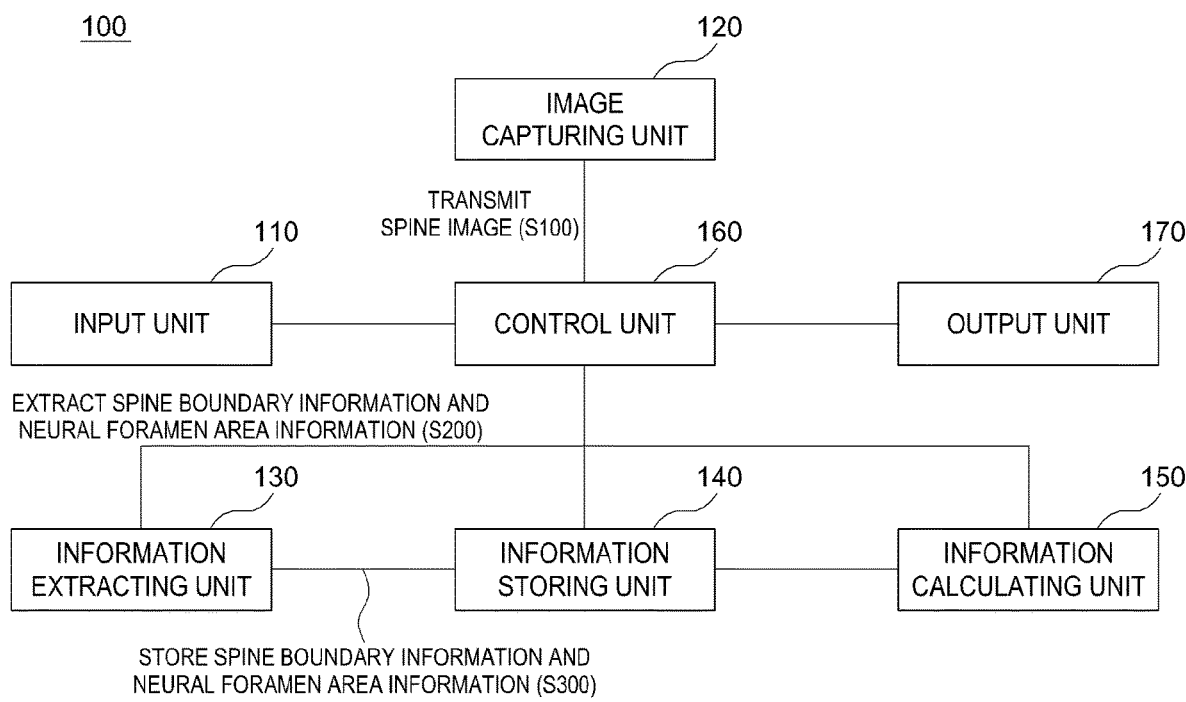
FIG. 3 is a block diagram specifically illustrating (a) step to (c) step of the method for providing a foraminal stenosis ratio using 3-dimensional CT according to the embodiment of the invention.

FIG. 3 is a block diagram specifically illustrating (a) step to (c) step of the method for providing a foraminal stenosis ratio using 3-dimensional CT according to the embodiment of the invention.

In the (a) step, the input unit 110 receives input information for capturing a spine of a patient by a doctor.

In addition, the image capturing unit 120 operates in response to the input signal transmitted from the input unit 110 and captures the spine of the patient. The captured spine image of the patient is transmitted to the information extracting unit 130.

In the (b) step, the information extracting unit 130 detects a neural foramen between adjacent vertebrae by using a pixel value of a spine image obtained by erasing a facet joint and a spinous process from the spine image of the spine of the patient with a program and extracts the neural foramen area information. To this end, the information extracting unit 130 extracts the spine boundary information based on the pixel value of the spine image and extracts neural foramen area information located between adjacent items of spine boundary information based on the spine boundary information.

More specifically, the (b) step includes (b1) step of extracting the neural foramen area information by rotating the spine image by 1° in a Y-axis direction and then rotating the spine image around a spine of the spine image by 1° at a time to reach 360° by the information extracting unit 130, and (b2) step of transmitting an angle of the neural foramen, the neural foramen area information depending on the angle of the neural foramen, and the maximum neural foramen area information to the information storing unit 140 by the information capturing unit 130. Here, a Y axis mean a direction perpendicular to the spine, and the spine image is rotated by up to 30° in the Y-axis direction.

The information storing unit 140 additionally stores a normal model obtained through deep learning of image information of an unspecified number of neural foramina.

Figure 4:
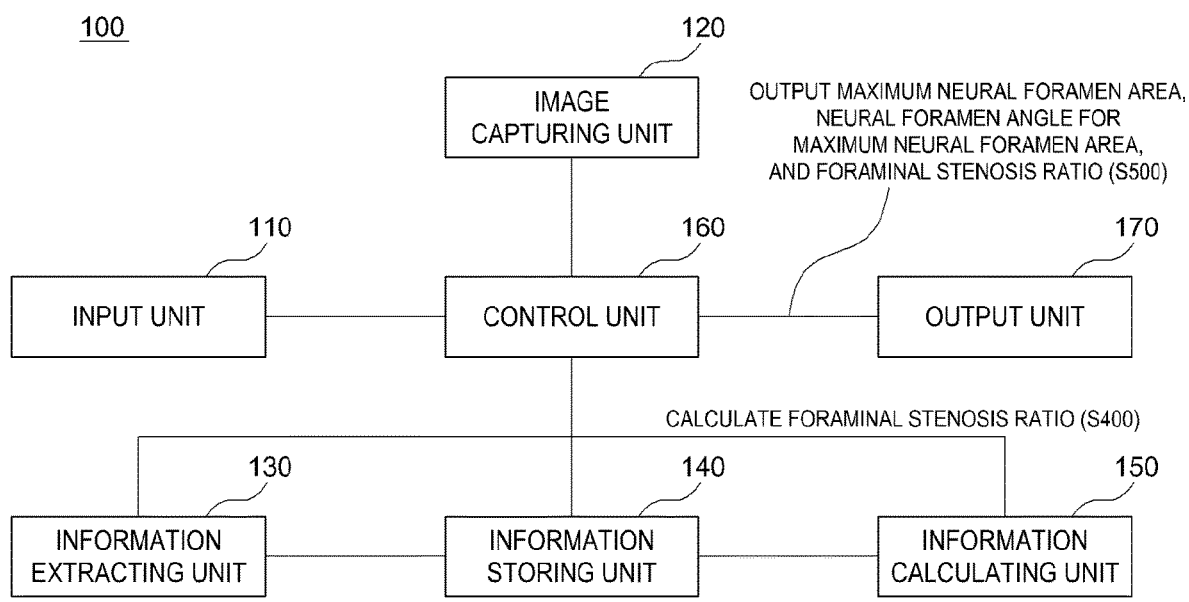
FIG. 4 is a block diagram specifically illustrating (d) step and (e) step of the method for providing a foraminal stenosis ratio using 3-dimensional CT according to the embodiment of the invention.

FIG. 4 is a block diagram specifically illustrating (d) step and (e) step of the method for providing a foraminal stenosis ratio using 3-dimensional CT according to the embodiment of the invention.

The (d) step includes (d1) step of transmitting an image of the maximum neural foramen area information and the angle of the neural foramen to the output unit 170 by the information calculating unit 150, the maximum neural foramen area information and the angle of the neural foramen being transmitted from the information storing unit 140, and (d2) step of transmitting a spine image obtained when rotation is performed by 180°, of the obtained spine images, to the output unit 170 by the information calculating unit 150.

In addition, the (d) step includes (d3) step of mathematically estimating the foraminal stenosis ratio by comparing the neural foramen area information with reference to the spine image having the maximum neural foramen area information of items of the neural foramen area information by the information calculating unit 150 and (d4) step of estimating the foraminal stenosis ratio by comparing a roundness value of the spine boundary information with preset neural foramen area information by the information calculating unit 150.

In executing the (d3) step and the (d4) step, when the roundness value indicating curvedness of the spine boundary information is less than 0.5, the following (d5) step and (d6) step can be executed.

Hence, when the foraminal stenosis ratio is difficult to calculate due to the roundness value of less than 0.5, the (d) step includes the (d5) step of calculating the foraminal stenosis ratio by comparing the neural foramen with at least one of other neural foramina and the (d6) step of calculating the foraminal stenosis ratio by comparing the normal model with the neural foramen by the information calculating unit 150.

Next, in the (e) step, the output unit 170 can output the foraminal stenosis ratio and at least one of an image of the maximum neural foramen area information and the angle of the neural foramen and a spine image obtained when the rotation is performed by 180° of the spine images.

Basically, the output unit 170 outputs the image of the maximum neural foramen area information and the angle of the neural foramen and at the same time outputs an image of maximum neural foramen area information and an angle of a neural foramen located at an opposite side of the front (rotation by 180° from the front) which is captured by the image capturing unit 120. In this manner, a doctor can provide not only spine-related information of the front but also spine-related information on an opposite side thereof to a patient. Thus, it is convenient for a doctor to explain a state of the spine to the patient, and the patient can more easily understand a current state.

According to the configuration described above, the invention is effective in that an objective and quantitative foraminal stenosis ratio can be provided to a patient along with a spine image, spine boundary information, and neural foramen area information.

In addition, according to the configuration described above, the invention is effective in that a previously captured CT scan image is used and thus there is no concern about being exposed to additional radiation.

In addition, according to the configuration described above, the invention is effective in that improvement of the stenosis can be evaluated quantitatively in evaluation after spinal surgery.

In addition, according to the configuration described above, the invention is effective in that a total volume of overgrown bone (bone spur) which is to be removed through spinal surgery can be obtained.

In addition, according to the configuration described above, the invention is effective in that when a surgery plan and robotic surgery or an interventional procedure (surgery) are used, an angle and an area of approach to a lesion can be provided such that to assist surgery.

Effects of the invention are to be construed not to be limited to the above-mentioned effects but to include any effect that can be derived from configurations of the invention described in the detailed description of the preferred embodiment and claims of the invention.

The description of the invention described above is provided as an example, and a person of ordinary skill in the art to which the invention belongs can understand that it is possible to easily modify the invention to another embodiment without changing the technical idea or essential feature of the invention. Therefore, the embodiment described above is provided to be understood as exemplified examples in every aspect and not as examples limiting the invention. For example, the configurational elements described in singular forms can be realized in a distributed manner, and the configurational elements described in a distributed manner can be realized in a coupled manner likewise.

The scope of the invention has to be represented by the claims to be described below, and meaning and the scope of the claims and every modification or modified embodiment derived from an equivalent concept of the claims have to be construed to be included in the scope of the invention.

What is claimed is:

1. A method for providing a foraminal stenosis ratio using a 3-dimensional computerized tomography (CT) scanner, the method comprising:
   (a) transmitting a spine image of a patient by the 3-dimensional CT scanner in response to an input signal, the spine image being captured by the 3-dimensional CT scanner;
   (b) extracting spine boundary information and neural foramen area information based on a pixel value of the spine image;
   (c) storing the spine boundary information and the neural foramen area information in an information storage medium;
   (d) calculating the foraminal stenosis ratio using the spine image, the spine boundary information, and the neural foramen area information; and
   (e) outputting maximum neural foramen area information of the neural foramen area information, a neural foramen angle for the maximum neural foramen area information, and the foraminal stenosis ratio,
   wherein the (b) step includes detecting a neural foramen between adjacent vertebrae by using the pixel value of the spine image obtained by erasing a facet joint and a spinous process from the spine image of the patient and extracting the neural foramen area information.

2. The method for providing the foraminal stenosis ratio using the 3-dimensional CT scanner according to claim 1, wherein the (b) step further includes:
   (b1) extracting the neural foramen area information by rotating the spine image by 1° in a Y-axis direction and then rotating the spine image around a spine of the spine image by 1° at a time to reach 360°; and
   (b2) transmitting an angle of the neural foramen, the neural foramen area information depending on the angle of the neural foramen, and the maximum neural foramen area information to the information storage medium by the 3-dimensional CT scanner, and
   wherein the spine image is rotated by up to 30° in the Y-axis direction.

3. The method for providing the foraminal stenosis ratio using the 3-dimensional CT scanner according to claim 2, wherein the (d) step includes:
   (d1) transmitting an image of the maximum neural foramen area information and the angle of the neural foramen, the maximum neural foramen area information and the angle of the neural foramen being transmitted from the information storage medium; and
   (d2) transmitting a spine image obtained when rotation is performed by 180° of the obtained spine image.

4. The method for providing the foraminal stenosis ratio using the 3-dimensional CT scanner according to claim 3, wherein the (d) step further includes:
   (d3) mathematically estimating the foraminal stenosis ratio by comparing the neural foramen area information with reference to the spine image having the maximum neural foramen area information of items of the neural foramen area information; and
   (d4) estimating the foraminal stenosis ratio by comparing a roundness value of the spine boundary information with preset neural foramen area information.

5. The method for providing the foraminal stenosis ratio using the 3-dimensional CT scanner according to claim 4, wherein the information storage medium stores a normal model obtained through deep learning of image information of an unspecified number of neural foramina, and
   wherein, when the foraminal stenosis ratio is difficult to calculate due to the roundness value of less than 0.5, the (d) step includes:
   (d5) calculating the foraminal stenosis ratio by comparing the neural foramen with at least one of other neural foramina; and
   (d6) calculating the foraminal stenosis ratio by comparing the normal model with the neural foramen.

6. The method for providing the foraminal stenosis ratio using the 3-dimensional CT scanner according to claim 3, wherein the (e) step includes outputting the foraminal stenosis ratio and at least one of an image of the maximum neural foramen area information and the angle of the neural foramen and the spine image obtained when the rotation is performed by 180° of the spine image.

* * * * *